Sept. 29, 1959  R. B. STEELE  2,906,860
MULTIPLE ARC WELDING
Filed Sept. 16, 1957

INVENTOR.
RICHARD B. STEELE
BY H. Hume Matthews
Edmund W Bopp
ATTORNEY & AGENT

United States Patent Office 2,906,860
Patented Sept. 29, 1959

2,906,860
MULTIPLE ARC WELDING

Richard B. Steele, Scottsdale, Ariz., assignor to Air Reduction Company, Incorporated, New York, N.Y., a corporation of New York Application September 16, 1957, Serial No. 684,395

5 Claims. (Cl. 219—135)

This invention relates to electric arc welding with a plurality of consumable electrodes. It is described herein as applied to consumable electrode inert gas shielded arc welding of the type disclosed in U.S. patent to Muller et al., No. 2,504,868 wherein the consumable electrode is fed at a substantially constant preselected speed to a high current density self regulating arc, although in its broader aspects, it is applicable to other types of arc welding.

There are many welding applications in which it is desirable to take advantage of the high weld metal deposition rate of simultaneous plural arcs struck to a plurality of consumable electrodes. By way of example, it may be desired to deposit a layer of relatively hard, long wearing material, e.g., aluminum bronze, on a body of softer material, e.g., steel. Conversely, it is sometimes desired to deposit a layer of softer metal on a hard body. It has been proposed to deposit metal for these purposes by welding techniques, including electric arc welding. Such an operation is commonly called overlaying or surface welding.

In surface welding, it is essential that the heat of the weld melt only enough of the underlaying body to ensure a good bond. If there is any deeper penetration, the material of the underlaying body may dilute the surface material and alter the characteristics of the overlay.

It is common in surface welding to use a welding machine which establishes a fixed rate of travel of the arc along the workpiece, and also to use an automatic continuous electrode wire feed synchronized with the rate of travel, in order to ensure an even coating of the deposited layer.

An electric welding arc moves along a linear path with respect to a workpiece, and deposits on the workpiece a band of metal which extends only to a limited distance on either side of that path. Surfacing operations commonly are required to cover areas whose width is substantially greater than the width of the band deposited by a single arc moving along a straight path. In order to avoid the necessity for repeated passes of the arc to cover an area of substantial width, various techniques have been developed to increase the width of the band deposited by a single arc. One of these techniques is to oscillate the arc alternately to opposite sides of a straight path along the workpiece. The maximum practical amplitude of oscillation is limited, however, and consequently the maximum band width which can be deposited by that technique is likewise limited.

Another technique is to use two arcs formed by two welding heads mounted side-by-side on a carriage, and moved side-by-side across the workpiece, with or without simultaneous oscillation of the carriage.

In a preferred arrangement of two arcs, the arcs are series connected. In this way the two arcs are of opposite polarity, have a tendency to repel one another, and may be operated close together without merging, as in the case of arcs of the same polarity.

While the twin series-connected arcs are effective to widen the deposited band, they lead to operational difficulties concerned with the starting of the arcs. These difficulties are encountered particularly with low resistance electrode materials such as aluminum and copper, although they may, upon occasion, be encountered with almost any consumable electrode material particularly when using alternating current series arcs.

Single high current density self regulating direct current welding arcs are commonly started by bringing a continuously fed welding electrode into contact with the workpiece. The arc may then start either by a vaporization or flashing of some protuberance at the electrode tip (commonly called a contact type start), or by resistance heating of the electrode by the large current surge which occurs because of the absence of an arc load on the source of energy, with resultant melting and collapse of a section of the electrode close to the workpiece (commonly called a fuse type start).

Various techniques are employed to assist in starting a welding arc. One such technique is to trim or otherwise form the end of the electrode wire to a sharp point to give a contact type start. Another techique is to use a small ball of steel wool betwen the electrode and the workpiece. The steel wool, being high resistance material with small diameter filaments, melts readily and gives a fuse type start.

The problems of arc starting are intensified in the case of alternating current welding arcs, since the arc is extinguished twice during every cycle, and must reestablish itself. While in most instances, there are sufficient ionized and highly heated particles remaining between the electrode and the workpiece so that the arc is reestablished without difficulty, nevertheless the fact that the arc is extinguished so frequently leads to occasional difficulty in restarting the arc. A common technique is to employ a superimposed high frequency, high voltage component (of the order of 10 kilocycles up to several megacycles at 1000 to 2000 volts, for example) which breaks down the arc gap with a spark, providing a path for the heavy current arc to follow. This technique, although effective, is undesirable because of interference with radio and other communications facilitates.

When twin series-connected high current density self regulating arcs are employed for overlay work it is preferred that the wire feeds of the two arcs be driven synchronously, in order to ensure uniform coating of the surface. It is highly desirable to start the arcs simultaneously, or as nearly so as possible. However, as a practical matter, one electrode must in fact contact the work before the other. With a straight series connection (current path from the first electrode to the work and thence to the second electrode), there is no potential between the first electrode and the work when the first electrode touches the work because the circuit is open between the work and second electrode. As a result no arc can start between the first electrode and the work and the first electrode has an opportunity to make good electrical contact with the work by "stubbing" (the stalled feed motor urging the electrode end into firm contact with the work) or by coiling up in sliding contact with the work as the wire feed continues to push wire down against the work. The contact of the first electrode against the work places the open circuit voltage of the welding machine across the gap between the work and the second electrode. When the second electrode contacts the work its arc will start by one of the arc starting mechanisms previously described. However, since good electrical contact has already been made between the first electrode and the plate there is no opportunity for the first arc to start except by fuse action in the full cross section of the wire. With wires of high electrical conductivity fuse action of this type does not occur and the second arc will not start. Even if the arc does eventually start the weld may be spoiled by the welded on unfused wire that remains.

An object of the present invention is to provide improved methods and apparatus for welding utilizing twin series connected arcs.

Another object is to provide improved methods and apparatus for starting high current density self regulating series-connected arcs.

The foregoing and other objects are attained by providing a clutch between the wire feeding mechanism for each welding gun and the motor which drives that mechanism. This clutch is controlled by a relay responsive to the voltage across the arc, and effective when the arc voltage drops substantially to zero to disengage the clutch. The electrode wire is then not driven forward, and a single limited portion of the wire therefore remains in light contact with the workpiece until the arc starts and the arc voltage reappears. The normal electrode wire feed rate is then resumed.

Other objects and advantages of the invention will become apparent from a consideration of the following description and claims, taken together with the accompanying drawing.

Figure 1:
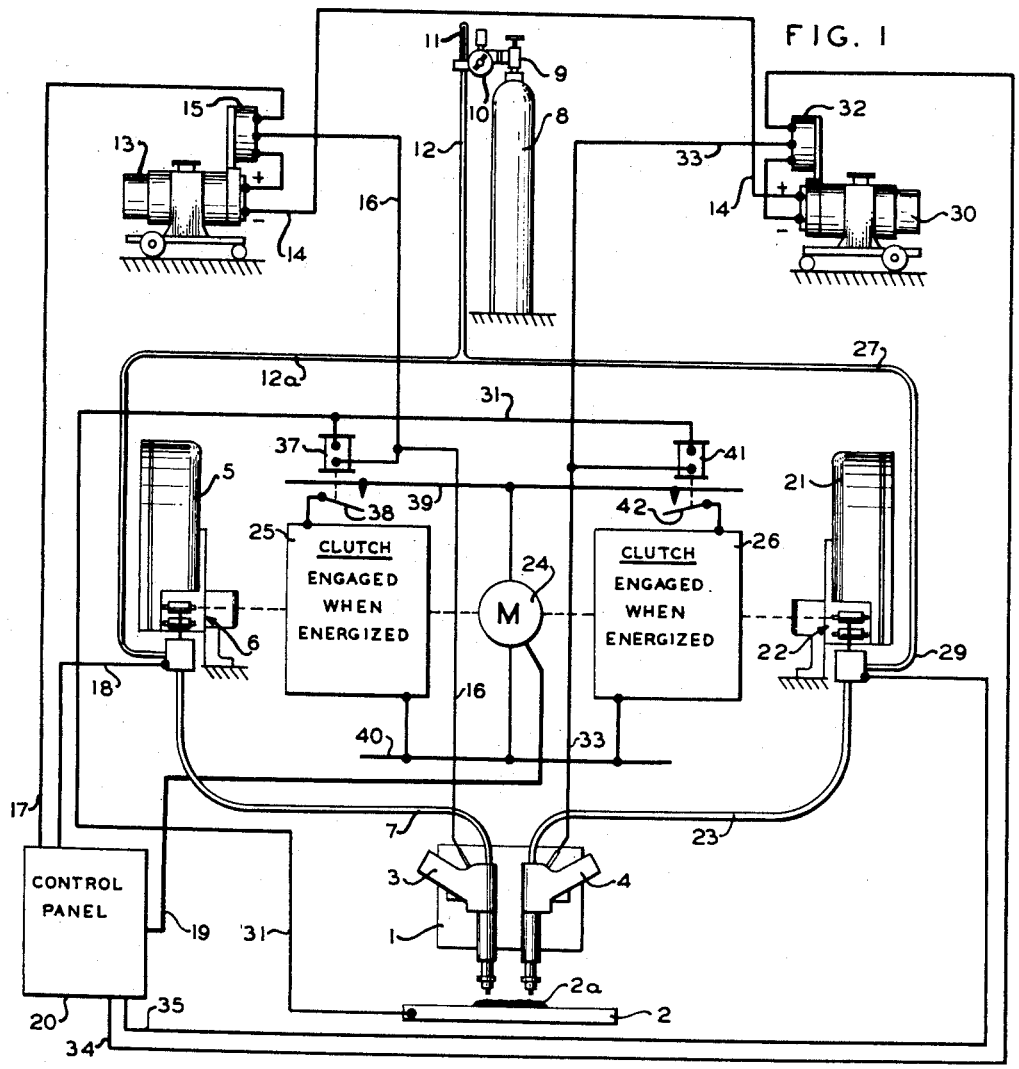
Fig. 1 is a somewhat diagrammatic illustration of one form of welding apparatus embodying the invention.

There is shown in Fig. 1 a welding machine which may be of any suitable conventional construction, and which includes a frame 1 movable relative to a workpiece 2. Two welding guns 3 and 4 are mounted on the frame 1 in side-by-side relation. The two welding guns are spaced apart by a distance not greater than the width of the weld band deposited by one gun, so that the two guns together deposit an integral, substantially double width band 2a on the workpiece. The welding guns 3 and 4 are preferably of the inert gas shielded type, provided with consumable wire electrodes and automatic feeding mechanisms for the electrode wires. Complete welding apparatus of this general type is disclosed in the U.S. patents to Muller et al., No. 2,504,868, Muller, No. 2,694,763, Muller, No. 2,694,764, and Turbett, No. 2,727,970. Only those parts of the conventional welding apparatus will be described herein which are considered necessary to a complete understanding of the present invention. For a more complete description of the high current density self regulating arc and conventional welding apparatus therefor, reference is made to the issued patents mentioned above.

Consumable electrode wire is fed to the gun 3 from a reel 5 by an associated motor driven feed mechanism 6. The electrode wire passes from the feed mechanism 6 to the gun 3 through a flexible casing 7.

Shielding gas, such as helium or argon, is supplied from a high pressure gas cylinder 8 equipped with a cylinder valve 9, a pressure reducing valve 10, and a flow meter 11. Conduits 12 and 12a carry the gas to the end of the casing 7 at the feed mechanism 6. The welding current for the gun 3 is provided by an appropriate welding current source. Since, according to the present invention, two arcs are to be operated in series it is convenient and practical to employ as the power source two conventional welding machines connected in series. Welding machines 13 is one of two such machines supplying welding current. One terminal of the welding machine 13 is connected directly to a terminal of opposite polarity on another such machine which is referred to in greater detail hereinafter, by conductor 14. The other terminal is connected through a contactor 15 and a conductor 16 to the welding gun 3.

Control cables 17 and 18 extend from a central control panel 20 to the contactor 15 and to the gas flow control valve in the feed mechanism 6 for the purpose of controlling the flow of welding current and the supply of inert gas, respectively.

The arc produced at the welding gun 3 is of reverse polarity, i.e., the electrode is the anode. The arc at the welding gun 4, however, is of the opposite or straight polarity in that the electrode wire serves as a cathode. The current supply, electrode wire supply and the gas supply for the welding gun 4 are the same as for the welding gun 3.

When using an inert gas shielded consuming electrode arc welding process satisfactory operation can be obtained by following the teaching of the previously referred to Muller et al. Patent No. 2,504,868. This is a reverse polarity process and the reverse polarity arc struck from the electrode of welding gun 3 to the plate 2 is therefore preferably operated according to the teaching of the said Muller et al. patent. However, unless some special provision is made, the straight polarity arc struck from the electrode of welding gun 4 to the work will not function satisfactorily. The wire burn-off rate will be excessive and the weld metal transfer globular, resulting in short-circuiting, spatter, disruption of the shielding gas envelope and a generally poor quality weld. To overcome these difficulties with the straight polarity arc, it is necessary to resort to the teaching of the aforementioned Muller Patent No. 2,694,763. According to the teaching of this patent, the wire burn-off rate and the metal transfer of the straight polarity arc can be made substantially identical to that of the reverse polarity arc by the appropriate addition to the arc of a substance comprising a metal selected from the group consisting of the alkali, alkaline earth, and rare earth metals. While these arc additions can be made in several forms, it is preferred for the purposes of the present invention to add these materials in the form of superficial additions to the electrode wire. Accordingly, all reference hereinafter to the electrode wire used in welding gun 4 in the direct current series arc process (the straight polarity arc) is to be understood to mean an electrode wire having a superficial coating of an emissive agent as taught by Muller Patent No. 2,694,763.

The above described specially treated consumable electrode wire is fed to the gun 4 from a reel 21 and an associated motor driven feed mechanism 22. The electrode wire passes from the feed mechanism 22 to the gun 4 through a flexible casing 23. The feed mechanisms 6 and 22 may be synchronized when this is desirable, either by use of a common motor 24 to drive them, as shown, or by synchronizing two motors, to keep the feed rates equal, or substantially so. In the arrangement shown, motor 24 drives feed mechanism 6 through an electrically operated clutch 25. A solenoid operated friction clutch of conventional design is satisfactory for this service. Motor 24 also drives feed mechanism 22 through an electrically operated clutch 26. Operation of motor 24 is controlled from control panel 20 to which it is connected by control cable 19.

Shielding gas is supplied to the gun 4 from the cylinder 8 and its associated equipment through conduit 12, and a branch conduit 27 to the end of casing 23 at the feeding mechanism 22.

It has previously been stated herein that the particular embodiment illustrated in Fig. 1 utilizes two conventional power sources in series. Welding machine 13 is one such source and has previously been referred to. Welding machine 30 is the other. One terminal of welding machine 30 is connected directly to welding machine 13 by conductor 14. The other terminal is connected through a contactor 32 and a conductor 33 to the welding gun 4.

Control cables 34 and 35 extend from the central control panel 20 to the contactor 32 and to the gas flow control valve in the feed mechanism 22 for the purpose of controlling the flow of welding current and the supply of inert gas, respectively.

Energization of the clutch 25 mechanically coupling motor 24 to wire feed mechanism 6 is controlled by a relay 37 which operates a contact 38. The energizing circuit for clutch 25 may be traced from a power supply line 39 through the contact 38 and clutch 25 to the opposite power supply line 40. The winding of the relay 37 is connected between the conductors 31 and 16, and is therefore connected directly between the workpiece 2 and the wire electrode at the welding gun 3. When there is an arc at that gun, or when the welding circuit is energized and the electrode wire is spaced from the workpiece 2, then a substantial potential difference exists between the electrode and the workpiece, the relay 37 is energized, and the contact 38 is closed. When the electrode is contacting the workpiece and no arc is present, or when the welding circuit is deenergized there is no potential drop between the welding electrode and the workpiece 2, and the relay winding 37 is deenergized. Relay 37 is a relatively high impedance device which draws but a small current and does not affect the welding arc.

The clutch 26 is similarly controlled by a relay 41 which operates a contact 42. The energizing circuit for clutch 26 may be traced from power supply line 39 through contact 42 and clutch 26 to the power supply line 40. The winding of relay 41 is connected between the wires 31 and 33, and is thus connected directly between the workpiece 2 and the wire electrode at the welding gun 4. As in the case of relay 37, the relay 41 is energized when arc or open circuit voltage exists at the welding electrode, but is deenergized when either the electrode is in contact with the workpiece or the welding circuit is deenergized.

*Operation*

Under starting conditions, the welding machines 13 and 30 are operating and their contactors 15 and 32 are closed. Motor 24 is running and the valves in the shielding gas supply lines are open. Under these conditions the clutch control solenoids 37 and 41 are effectively series connected across the combined open circuit voltage of the two welding machines 13 and 30. The electrical path through the clutch control solenoids under these conditions is as follows: Starting with the positive terminal of welding machine 13, the path is through closed contactor 15 and conductor 16 to the junction of conductor 16 with the lead of solenoid 37, through solenoid 37 to conductor 31 and thence to its junction with the lead of solenoid 41, through solenoid 41 to conductor 33 and through closed contactor 32 to the negative terminal of welding machine 30. This condition energizes solenoids 37 and 41 causing them to close their respective contacts 38 and 42 which in turn, cause the electrically operated clutches 25 and 26 to be energized from supply lines 39—40, thereby causing both clutches to be engaged. Inasmuch as motor 24 is operating, wire feed mechanisms 6 and 22 operate to withdraw wire from reels 5 and 21 respectively and feed these wires toward the workpiece 2 through guns 3 and 4. Because it is impossible, and with this invention unnecessary, for both wires to strike the workpiece at exactly the same instant, one of them will make such contact before the other. This may be the result of one wire being cut back shorter than the other after the previous weld, the wire feed mechanisms not being synchronized, or when they are synchronized, the feed speeds being different. For purposes of explaining the operation, assume that the wire fed through gun 3 contacts the workpiece 2 in advance of the time the wire being fed through gun 4 contacts the workpiece. When this occurs the control relay 37 is in effect, short-circuited by the welding wire touching the work. This is true since solenoid 37 is connected between the conductors 31 and 16, and the contact of the wire of gun 3 with the workpiece 2 in effect makes a unitary conductor of conductors 31 and 16. The result of this is that relay 37 is deenergized and its contacts 38 in the control circuit of clutch 25 open, causing clutch 25 to disengage and interrupt the operation of wire feed unit 6. The wire fed through gun 3 therefore comes to rest in contact with the workpiece 2. There is no opportunity for an arc to start between this wire and the work because there is no welding potential impressed between the wire and the work as long as there is an open circuit in the welding circuit as a result of the gap existing between the workpiece 2 and the electrode wire fed through gun 4. It may readily be seen that should the wire fed through gun 3 bounce back upon contact with the workpiece 2, or for some other reason lose contact, relay 37 will again be energized which again energizes clutch 25, and causes the wire feed to resume until contact is again made. This assures the wire being fed through gun 3 being maintained at rest and in light contact with the workpiece 2. Clutch control solenoid 41 remains energized since it is connected between conductor 31 and conductor 33. As a result, clutch 26 remains engaged and the wire continues to feed through gun 4. As soon as this wire contacts workpiece 2 the welding circuit is completed from the positive terminal of welding machine 13 through the electrode in gun 3 which is in contact with workpiece 2, through the workpiece 2 and through the electrode in gun 4 which has now made contact with workpiece 2 back to the negative terminal of welding machine 30. The resulting welding current surge will start one or both of the arcs. Should just one of the arcs start, as soon as the voltage across the arc gap rises substantially from the short circuit condition, the respective control relay will again be energized and the clutch will be caused to engage and resume the wire feed. The other wire will remain at rest until its arc starts which will cause its wire feed to resume operation. In practice, the two arcs will be caused to start so rapidly with this mode of operation that they will for all practical purposes start simultaneously. Arc starting is facilitated with this arrangement in that full open circuit potential of both machines (twice the normal arc starting potential) is available to start each arc.

Figure 2:
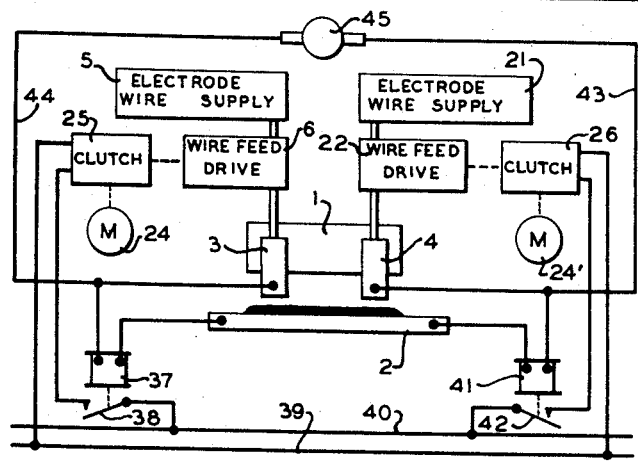
Fig. 2 is a simplified diagram of apparatus similar to that of Fig. 1 but having certain modifications in the wire feed means and the welding power supply.

Figure 2 is a simplified diagram of a welding system similar to that disclosed in more detail in Figure 1. The primary difference between the circuit of Figure 2 and that of Figure 1 other than simplification, is that in Figure 2 there is a single source of welding power 45 whereas in Figure 1 there are two series-connected separate welding power sources. Since the welding voltage requirement for starting two arcs in series is obviously different from the requirement for a single arc, the single welding power source 45 must be appropriately designed. Also in Fugure 2 each wire feed drive mechanism is powered by an individual wire feed motor. Those elements in Figure 2 which correspond fully to their counterparts in Figure 1 have been given the same reference numerals and will not be further described. In Figure 2 the welding current flows through a series loop which may be traced from one terminal of the welding power source 45 through conductor 43, welding gun 4, workpiece 2, welding gun 3 and conductor 44 back to the other terminal of the power source 45. As in the case of Figure 1 the clutch control relay 37 is connected between the electrode on welding gun 3 and the workpiece 2 and the clutch control relay 41 is connected between the electrode on welding gun 4 and the workpiece 2.

Prior to starting the arc, both electrode wires are spaced from the workpiece. The two control relays 37 and 41 are connected in series across conductors 44 and 43 which are connected to the terminals on power source 45. This causes both relays to be energized closing their contacts 38 and 41 respectively. When these contacts are closed the electrically operated clutches are energized and the wire feed mechanisms operate to withdraw wire from the respective wire supplies 5 and 21 and feed it toward the workpiece through the guns 3 and 4. When one of the wires contacts the workpiece 2, its relay winding is short-circuited and its contact opens, so that its wire feed stops. When the second electrode touches the workpiece the welding circuit is complete and the arcs start. As each arc starts, voltage increases across the respective control relay winding and the relay operates to close its contact and resume the wire feed to that particular arc.

While the invention has been described as being applicable to direct current welding, it is equally applicable to alternating current welding systems, providing a thermionic emissive material is supplied to the welding arcs in the manner taught by the previously referred to Muller Patent No. 2,694,764.

While the invention has been shown and described as applied to surface welding with the inert gas shielded arc welding process, it is to be understood the invention is also applicable to all consumable electrode arc processes for seam welding and other arc working applications, as well as overlay work. Other modifications thereof will readily occur to those skilled in the art and it is to be understood that the invention is not limited to the particular forms disclosed but may be used in other ways without departure from its spirit as defined by the following claims.

I claim:

1. A method of starting two series connected high current density self regulating electric welding arcs formed between two consumable electrode wires and a common workpiece which comprises feeding both said wires toward said workpiece continuously at rates to maintain said high current density self regulating welding arcs between each of said wires and said common workpiece as metal is transferred across said arcs from said electrodes to said workpiece until a first of said wires makes a light electrical contact with said workpiece, interrupting the feed of said first wire immediately upon its making said light contact with said workpiece, continuing to feed the second of said wires until it makes a light electrical contact with said workpiece to thereby complete a welding circuit through a portion of each of said wires and said workpiece, interrupting the feed of said second wire immediately upon its making a light contact with said workpiece to complete the series circuit through said electrodes and said workpiece, and thereafter independently resuming the feed of each one of said wires toward said workpiece when an arc is formed between that particular electrode and said workpiece.

2. Electric arc welding apparatus comprising a source of welding current having terminals of opposite polarity and the voltage and current requirements for supplying two high current density self regulating welding arcs connected in series circuit with one another between said terminals of opposite polarity, means for introducing welding current of one polarity from one terminal of said source into a first consumable electrode wire, means for introducing welding current of opposite polarity from the other terminal of said source into a second consumable electrode wire, means for feeding both said consumable electrode wires toward a common workpiece continuously at rates to maintain said welding arcs between each of said wires and said common workpiece as metal is transferred across said arcs from said electrodes to said workpiece, and means for independently and immediately interrupting the feed of each of said electrodes toward said workpiece when said electrode is in light electrical contact with said workpiece.

3. Electric arc welding apparatus for supplying welding current to two series connected high current density self regulating welding arcs comprising two welding guns, means for continuously feeding consuming wire electrodes to the two guns at rates required for maintaining said welding arcs between each of said wires and a common workpiece as metal is fused and transferred across said arcs to said workpiece, and means for supplying welding current to said two electrodes in series circuit with one another and said common workpiece, said feeding means comprising two wire feed means, one for each of the two guns, motor means for operating said two wire feed means, two clutches connecting said motor means to the respective wire feed means, and control means, for each gun, responsive to the potential difference between the electrode and the workpiece, for controlling the clutch between the motor means and the associated wire feed means, said control means being effective when said potential difference is substantially zero to disengage its associated clutch and thereby to stop immediately the wire feed, and being effective when said potential difference is greater than said substantial zero value to engage its associated clutch and thereby to establish immediately said required wire feed rate.

4. Apparatus as defined in claim 3, in which each said control means comprises a relay having a winding and a contact operated thereby between first and second positions in response to energization of said winding by voltages greater than substantially zero, means connecting said winding between the workpiece and the associated electrode, electrical means for operating the associated clutch, and an energizing circuit for said clutch operating means including said contact.

5. Electric arc welding apparatus for supplying welding current to two series connected high current density self regulating arcs comprising two welding guns, means for continuously feeding a consuming wire electrode to each of said two guns at a substantially constant speed, means for supplying welding current to each of said two electrodes, and independent control means for each gun respectively responsive to the potential difference between the associated electrode wire thereof and the work piece and effective only when said potential difference is substantially zero to interrupt the feed of said associated electrode wire by said wire feeding means.

References Cited in the file of this patent

UNITED STATES PATENTS

| 2,045,803 | Richter | June 30, 1936 |
| 2,104,200 | Kopp | Jan. 4, 1938 |
| 2,401,722 | Clapp et al. | June 11, 1946 |
| 2,669,640 | Outcalt et al. | Feb. 16, 1954 |

FOREIGN PATENTS

| 554,687 | Great Britain | July 15, 1943 |